United States Patent [15] 3,666,873
Pincus [45] May 30, 1972

[54] SELECTION APPARATUS AND CIRCUITRY

[72] Inventor: Ralph M. Pincus, 384 Elliot Place, Paramus, N.J. 07653

[22] Filed: Mar. 16, 1970

[21] Appl. No.: 19,742

[52] U.S. Cl. ............................................................35/48 R
[51] Int. Cl. .............................................................G09b 5/00
[58] Field of Search.......................35/9 R, 48 R; 235/132 E

[56] References Cited

UNITED STATES PATENTS

| | | | |
|---|---|---|---|
| 2,654,163 | 10/1953 | Reynolds | 35/9 R |
| 2,562,179 | 7/1951 | Dorf | 35/48 R |
| 2,169,266 | 8/1939 | Matter | 35/9 R |
| R23,030 | 8/1948 | Holt | 35/48 R |
| 2,551,656 | 5/1951 | Breitenstein | 235/132 E X |
| 3,300,876 | 1/1967 | Johannsen | 35/9 R |
| 3,332,157 | 7/1967 | Kirkconnell et al. | 35/48 R |
| 3,245,157 | 4/1966 | Laviana | 35/9 R |
| 3,273,609 | 9/1966 | Walker | 35/9 R |

Primary Examiner—Wm. H. Grieb
Attorney—Samuel B. Smith

[57] ABSTRACT

This invention is related to a method, apparatus and circuitry for enabling various competitors to determine between themselves and by virtue of a counting apparatus the correctness or incorrectness of the selection or the time required to make the selection of some display events or the like of which one display is correct and the others incorrect.

The selections are controlled from consoles each having a number of selector units corresponding to the number of possible choices from any intelligence displayed. A correct choice from one control unit in any one console will temporarily inhibit all other consoles through a master control unit and a registration of the correct selection will be made.

In a preferred form the invention provisions can be made whereby reponse time testing can be utilized, as well as aptitude testing, for those individuals operating at different consoles. The apparatus is particularly adapted for educational purposes, aptitude testing, scholastical testing, response time testing and serves as programmable teacher for numerous purposes.

20 Claims, 8 Drawing Figures

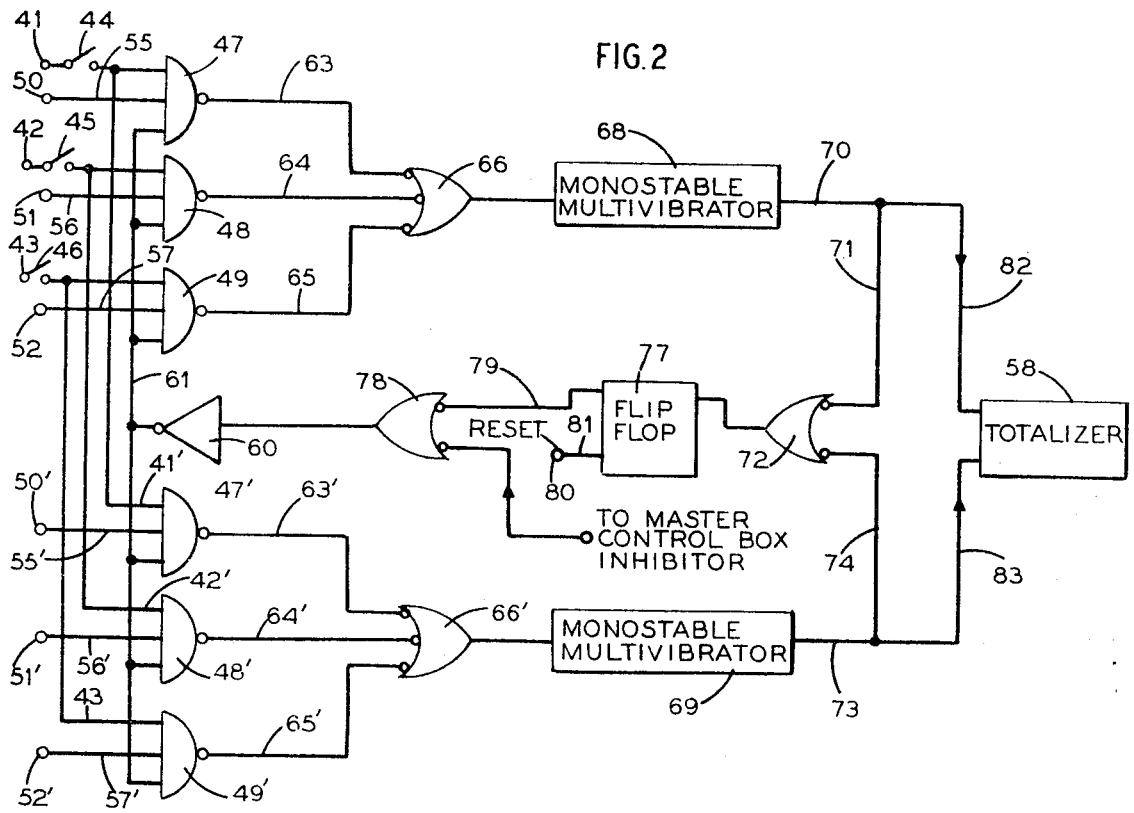

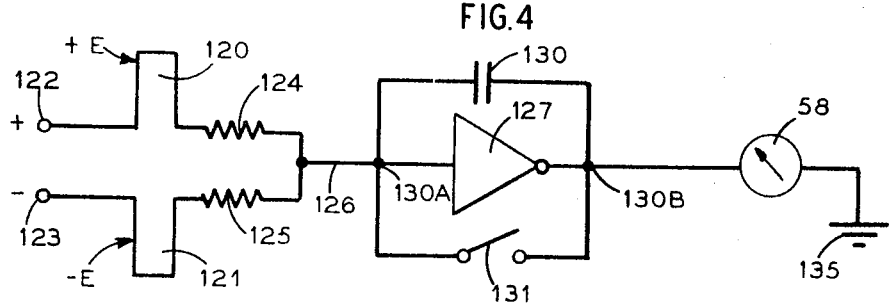
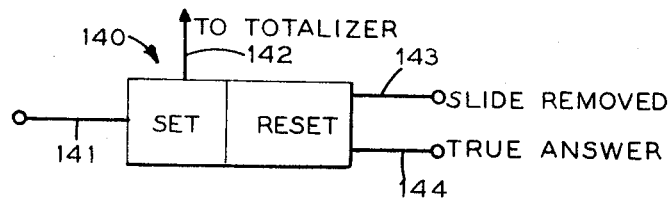
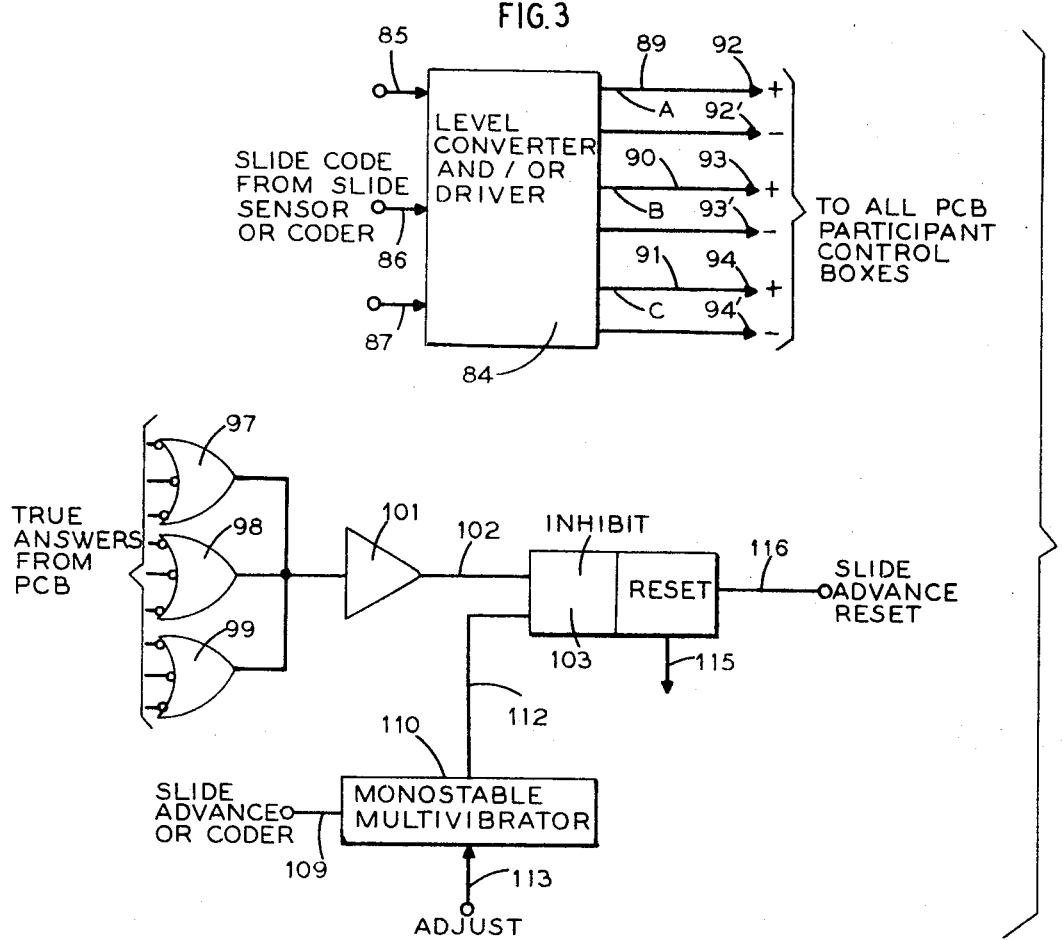

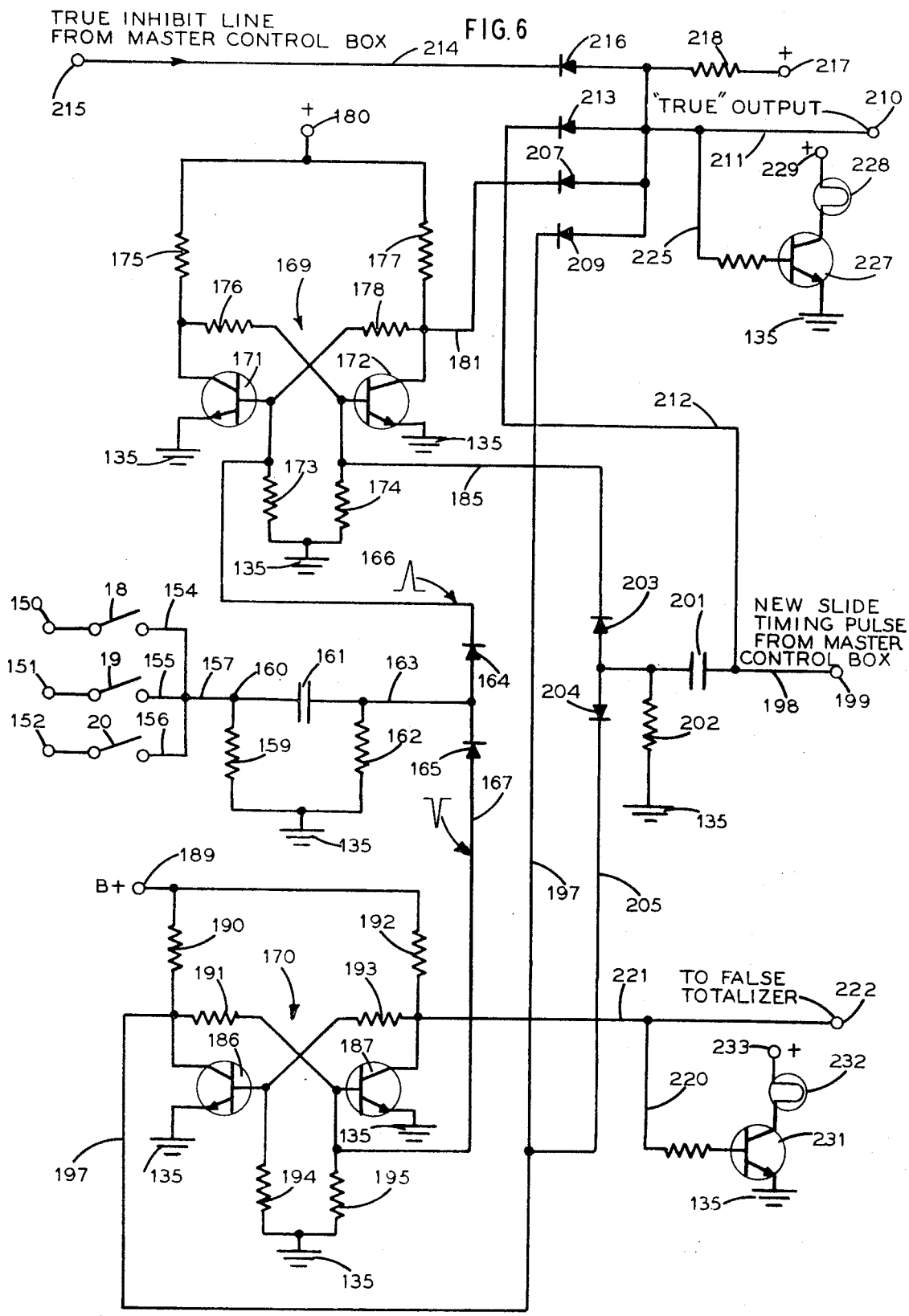

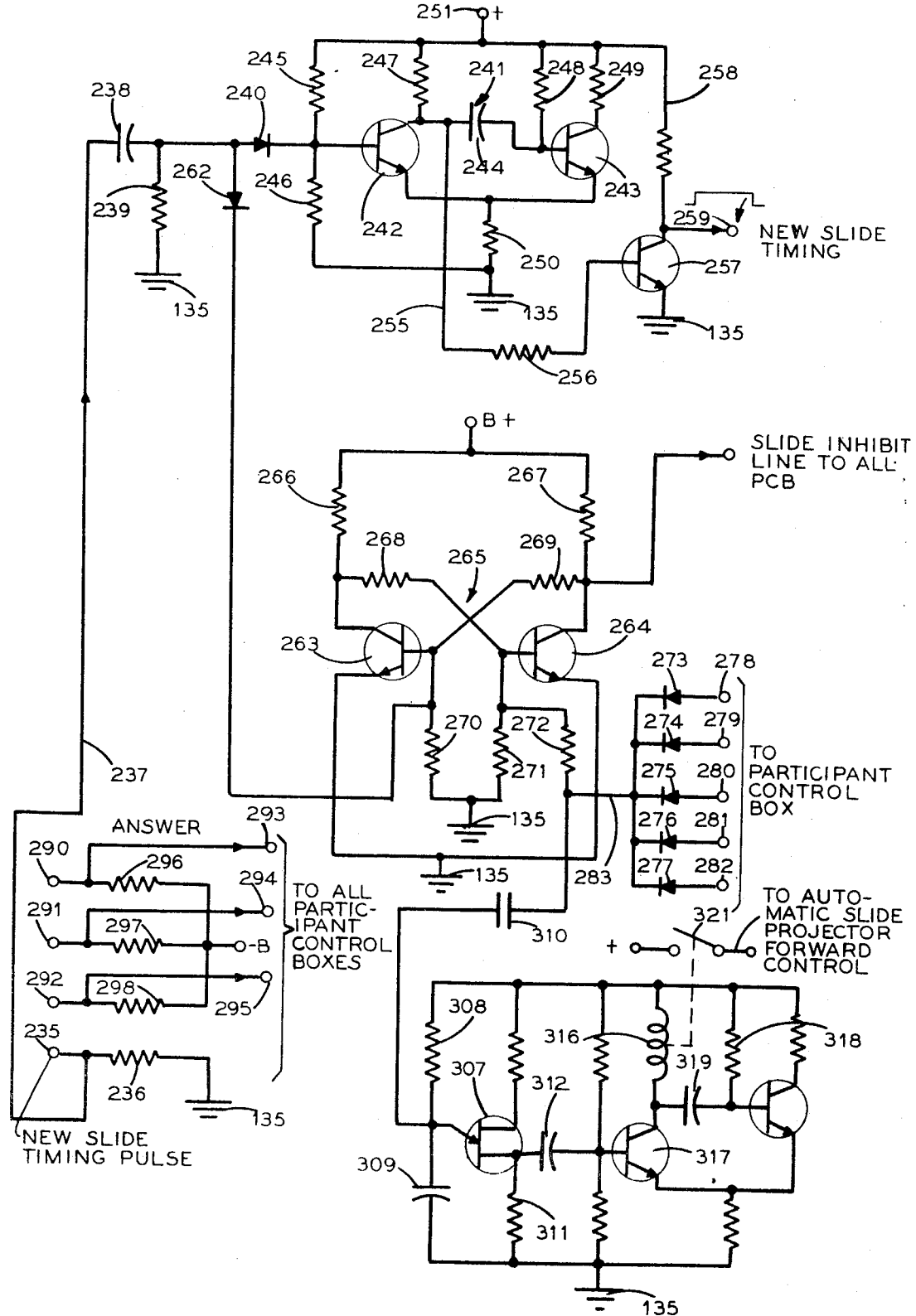

SELECTION APPARATUS AND CIRCUITRY

This invention relates to automatic competitive selection apparatus and circuitry. It is particularly concerned with circuitry by which to achieve registration of such effects, preferably in visible fashion and to compare results with competition, on the basis of correctness of answers and speed of response.

In its broader aspects the invention provides display equipment adapted to operate with unique components and attachments to provide from the combination such control means that all of logic, timing and memory are provided to establish a basis for the several separate, but, still related, components.

The invention contemplates using apparatus to display intelligence in visual or audible form suitably coded so that participants can make selection from what becomes visible or heard and thereby match their skills and alertness against others and themselves.

The apparatus may assume various forms although it normally utilizes certain basic or significant components. Such components normally embody apparatus to sequentially display logically controlled material such as an automatic slide projector, a tape recorder, a film projector, a cassette recorder, or various and selected combinations thereof. With these there is a suitable means to code material displayed according to its correctness, its category or, for instance, the beginning of the time when a participant is exposed to the display. There is also some suitable apparatus for enabling a participant to make selections. To derive full value provision is made for apparatus to compare any participant's answer with a coded reference for material correctness and speed, or both. There is normally a suitable means or apparatus to display the results of determination of the comparison apparatus with appropriate logic correction, such as will inhibit, answers from other participants. Then, it is usually desirable that such apparatus be so designed as to be capable of searching, in a forward or reverse direction, for particular material in sequence.

Some forms of the apparatus utilize an automatic slide projector and with this what may be termed a "slide sensor." This latter element senses the code and many and varied forms of units for the purpose may be used. These would include drums (usually with pins adjustable therein), plates, cards, or any shape of components suitable to the particular purpose of coding information arranged in an orderly fashion. In this way, any desired results or forms of apparatus and circuitry may be provided as a part of the sensing unit. These components are inter-related and contain the desired coding information, which may be of any desired form of sensing mechanism, such as magnetic, photoelectric, holes, pins and so on.

While it is above suggested that a slide projector be used in the several applications, it should be understood that this is purely illustrative. A film projector or some suitable sound emitting unit, such as a tape reproducing unit or a recording, can be utilized in conjunction with, or even in place of, the components to be discussed in what will follow herein as directed particularly to slide projectors.

The automatically projected slides and the projection thereof are controlled and advanced by the same or similar mechanisms, usually in the form of electrical signals operating to cause both the slide projection and the derivation of the signals related to these operations to be effective at the same time. For the purpose of illustration only, it will be assumed, as representative, that there will be multiple choices or selections which, as a preliminary illustration, then can be assumed as three, although in many cases the number might be greater, but principle wise there will be no departure from what is here to be disclosed. Where it is desired to have additional selections, of course, more but similar circuitry to the form herein disclosed, claimed and described will be used.

If the device is used as a selection unit and it is assumed that three possible choices can be made for each projection of any type of proposition, these might be designated as choices *a*, *b*, or *c*. Suppose, for instance, that the first projection or depiction of a problem is such that the first display in answering would be one of selecting position "*a*" if correct it is clear that any other choice would be in error. Then, when this choice occurs, a control of the sensing means concurrently takes place and this represents the true logic for the display, if correct, but otherwise no logic data would be entered.

Should the next projected scene be a portrayal of something where the correct selection would be, for instance, a choice in position "*c*" the entry of the logic would be varied accordingly. Other choices would likewise be made in accordance with other projections.

Further than this, it becomes desirable, at times, to add a fourth position to the slide sensor. Such a fourth position might provide a signal to denote the start of new instructional material. An additional feature of the slide sensor is the ability to sense the presence of a new slide, as will be discussed later. With this form of unit an incorrect choice could bring about a reversal in the direction and possibly speed of any advance mechanism until the fourth position is sensed. Following this, the advance direction may be reversed again and any portrayals, as well as projections in the nature of the inquiries, may be repeated, as already noted. This is of particular advantage when the invention is used as an instructional unit. When utilized as an instructional unit, the student will advance through material (tutorial, as well as questions on presented material) as long as he answers correctly. As soon as he answers incorrectly, the apparatus will search back to previous fourth position sensor and will afford the student an opportunity to relearn the most recent material.

Further than this, in some instances it is important that one should know the time when some particular participant responds after the projection of an image to the sensing of that which is there represented. This may be accomplished by starting a time interval counter when the projection initially occurs and there is a projection of some image or scene for observation. Then, provision is made to stop the counter action immediately when the participants give the correct answer or if the projection of the particular scene is removed. The time intervals from all the projections can then accumulate and the total then corresponds to the total response time of the participant at each of the locations for sensing or observation. Thus, if the time were greater for one participant than for some other participant the slower individual, of course, would not score as highly or as heavily as did the one located in some other position who had sensed what was being projected in a much lesser time.

The depicted totalizer forms an excellent means to provide for totalizing the various response times. There are various ways to achieve the desired results. From what will follow it will be apparent that the combination of the automatic projection and the sensing of what has been projected at different positions forms a rather unique and unusual type of apparatus for any purpose of analysis or for the testing of the quickness of response or knowledgability of the various parties for whom the tests are to be conducted. This may be termed an automatic slide projection application although this need not necessarily be the case. Broadly speaking, the invention as it here will be disclosed adopts a good many different combinations which make it useful in many fields. For instance, in educational considerations, it will embody a system that makes use of an automatic display mechanism and/or recording device used in conjunction with the circuitry here to be described in further detail to achieve a competitive and timed sensitive educational device. It will also provide a ready means for sensing coding and still further provide for an ease in changing the coding by a suitable and simple control of electrical apparatus controlling suitable drums, for instance, provided with sensing pins. On the other hand, the coding and the sensing may be optically achieved or magnetically or otherwise selected, or control may be by way of other circuitry as will become readily apparent when this full disclosure is read in connection with both the various figures of the drawings and the claims included as a part thereof.

There may be chosen also various other forms of testing. This can be done on a purely phychological basis with a means for utilizing the apparatus to test individuals on a large number of subjects and categories and then in accordance with the response time it will be possible to evaluate one against another for their intelligence quotients in different fields by reason of the rate and correctness of the slide or projection testing.

In connection with apparatus of the last-named type it is desirable to provide for totalizing the aptitude of the tested individuals in different characters or categories instantaneously so that results are immediately available at the end of the test period or term. This is done by suitable counting apparatus which is designed to count both forward and backward. A count in the forward direction can then be considered as indicative of either or both quickness of response and correctness of choice. A count in the reverse direction would indicate an error in choice or a lack of alertness and a very slow answer, comparing one participant with another.

In another form of the apparatus, means are provided for utilizing projection apparatus in combination with circuitry and/or recording devices used in conjunction therewith for teaching material to students automatically. In this case means for repeating displayed conditions may be provided particularly where selections have been incorrectly made in the first instance, and one participant has been able to make a far better showing than one or more of the other participants. Various means for testing the response to the projection can be utilized and a means for adding timing to record the variations and responses readily can be adopted to change the rate or ease of the recording operation. From the foregoing it becomes one of the objects of this invention to provide for making it possible to determine the relative merits of one participant versus another participant insofar as sensing the correctness of identifying different displays and correctly registering the same is concerned.

Another object of this invention is to enable participants to use their observations in an educational fashion whereby they can, through the use of appropriately arranged counters or totalizers, immediately evaluate the response time which they require to provide correct answers to projections of sound or pictorial representations of images on some suitable display associated with the apparatus utilized for effecting the tests.

Other objects are those of providing circuitry of a relatively suitable sort which can be readily expanded to accommodate additional participants or which can function so that the alertness or response time required by one individual versus another, or a group of others, can be measured and displayed, if necessary.

Other objects and advantages of the invention will, of course, become apparent and at once suggest themselves to those skilled in the art to which the invention is most closely directed when the accompanying drawings and claims are considered in conjunction with the description to follow. In the drawings FIG. 1 represents in purely schematic form the relationship between the automatic projection and display arrangement operating under the control of a master control box and controlable from two separate panel controls to provide for indicating at each control one of an assumed three choices or selections possible and then for providing the selection choices for at least two different competitors;

FIG. 2 diamatically illustrates a participant control box suitable for enabling certain participants random selections of at least three different types of characters and then to be able to measure and sense the time required for this effect being achieved;

FIG. 3 is a further schematic illustration of one form of master control box for which the operation is controlled;

FIG. 4 is a schematic representation of an analog totalizer thereby to totalize the correct and false selections;

FIG. 5 is a schematic showing of a form of circuitry, such as a flip-flop, whereby the totalizer is caused to function and, at the same time, readily manifest the true and the false answers;

FIG. 6 is a circuit particularly adapted to a representation of the participant control box which is shown schematically in FIGS. 1 and 2;

FIG. 7 is a showing of the master control box as depicted in one schematic form by FIGS. 1 and 3; and, FIG. 8 is a circuit diagram particularly adapted to showing a programmable teacher for use in the controlled type of operation.

Figure 8:
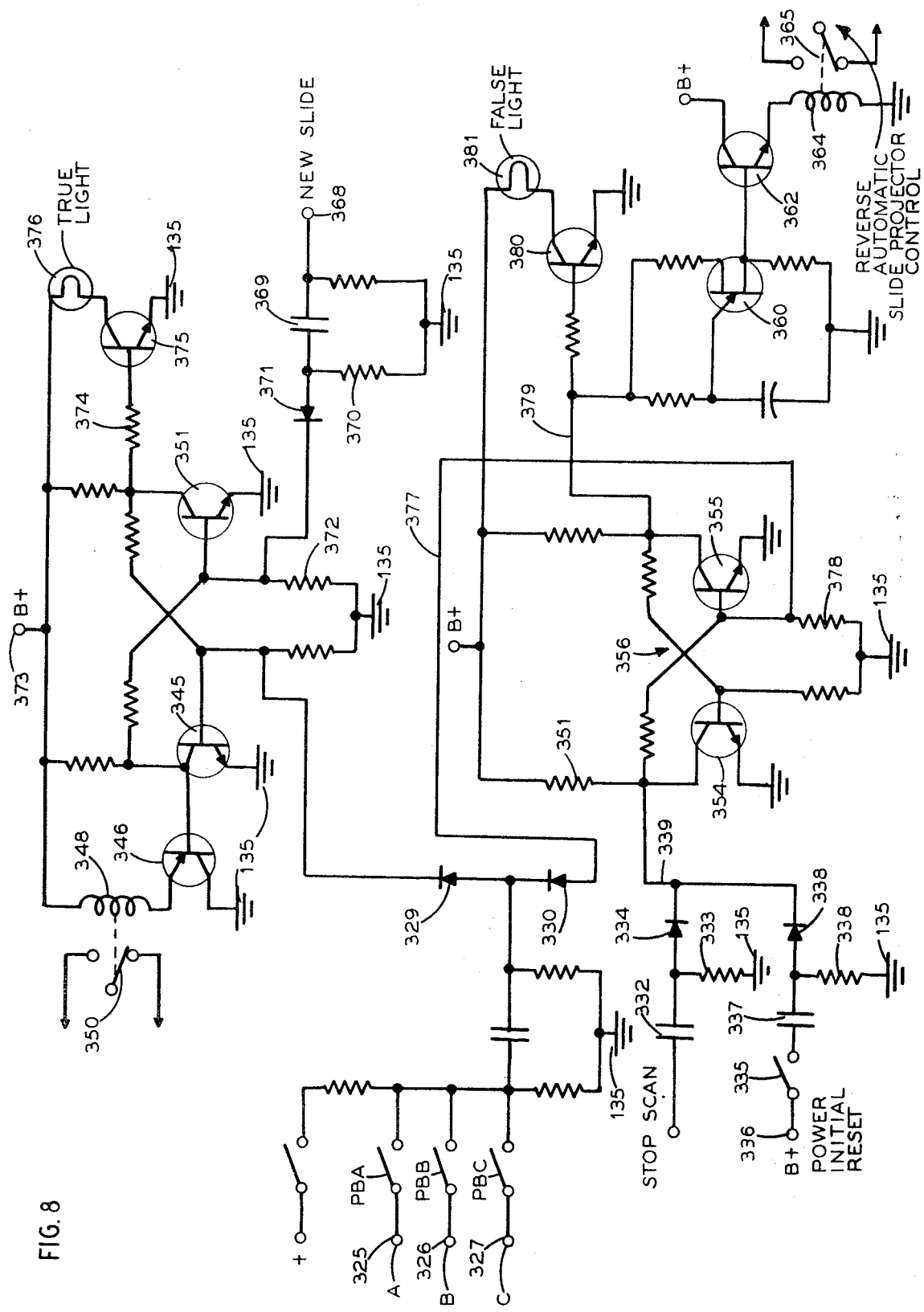

Referring now particularly to the drawings, and first to FIG. 1 thereof, for a further understanding of the invention, a suitable slide projector unit 11 (schematically shown) is operated under the control of a slide sensor 12 (as will later be described in further detail) to project images on a viewing area 13 that is usually constituted by a screen which is located within the range of vision of the participants to be tested and also within the range of projection of the unit 11.

Assuming that three special conditions, which can conveniently be designated as A; B; and C; are to be displayed by the slide projection under the control of the slide sensor 12, this is achieved through the combination of a master control box, schematically shown at 14, which will later be described in further detail. The master control box 14 provides an output signal along the conductor 15 to the slide projecting apparatus 11 to determine, with the aid of the slide sensor unit 12, when the projection occurs. The same master control box 14 provides the signals through the group of separate conductors 16 to each of the assumed separate conditions or positions A, B, and/or C of the slide sensor 12 to determine which of the plurality of conditions is to be satisfied.

The participants who are to select between projections A, B, and/or C at the two different positions 16 and 17, for instance, which constitute logic selection and totalizer arrangements, which will also be further described, are provided with control buttons or switches 18, 19 and 20 for position 16 and similar control buttons or switches 18', 19' and 20' at logic and totalizer control position 17.

To achieve a timing control for the operation, signals developed in the master control box 14 may be supplied as timing signals by way of the conductors 21 to each selector and totalizer point. Likewise, the master control box 14 is connected to supply decoded data for the particular chosen slides or projections by way of the conductor 22. Such data are supplied to each selection point to make the selection control effective. When this is done, and the slides representing pictorial displays are made available on the projection unit 11, as determined also by the slide sensor unit 12, the participants at each of the points 16 and 17 may select and make their choices of the correctness of some problem which may be submitted concerning the projection by pushing one and one only of the buttons (or switches) 18, 19, or 20, thus closing or energizing a circuit to indicate which of the assumed three possible choices they consider correct. The answer so chosen then causes a signal to be supplied from the first selector made along the conductor 25 back to the master control box 14. If the selection is made first at position 16, the circuitry, to be further explained, will preclude a choice being made at position 17, or vice versa. If, for instance, the choice or selection made at position 16 should prove to be correct then this fact will preclude any selection at all from being made at position 17. On the other hand, it could be that there can be arranged circuitry which will be indicative of the time difference between when the selections are made at each point so that the relative rate of response of the different selectors can be decided. Suppose, for instance, that the choice first made at the assumed first point 16 happened to be in error, circuitry will inhibit a second choice at 16, then the choice made later at point 17, even though later in time than that at position 16, will be transmitted by way of the conductor 25 into the master control box 14 and a registration of the correct answer will be received by and registered in the suitable totalizer.

In giving consideration to this proposal, the diagram of FIG. 1 shows that the projector 11 will identify the selected slides or displays. It is equipped with the sensing unit 12 so that there may be, in effect, a coding of what is displayed on the screen 13. One participant control box, such as the units 16 and 17, is provided for each participant. The operation could be such that the coding could be achieved in a separate unit, provided such unit is advanced in synchronism with the slide projector, or a drum or sliding identification cards or some related type of unit which will function synchronously with the other units. These units, with the control buttons or switches 18, 19, and 20 control the logic and the manner by which the totalizer will register the response time or correctness of each participant. As can be inferred from what is stated above, the master control box 14 contains the necessary logic and timing circuits. While for each station there may be minor differences in such a unit the broad principle for each is identical.

The important features to bear in mind are that the projector 11 projects coded slides or displays upon a viewing screen or area 13 in a selected sequence. This unit is normally and preferably controlled from the master control box 14 which contains the circuitry necessary to convert the coded information of the slide holders or other coding device into electrical signals which are interconnected to each of the participant's control units 16 or 17, as the case may be. At the control for each participant it is possible then to send back a complete answer signal each time the participant provides some type of answer.

The master control box 14 may be of such type unit that only the first correct answer to the projection will register to be totalized or, as already suggested, it may so function that only those answers which are given within some pre-selected time interval will be registered for totalization This control will be further outlined in what is to follow.

If reference is now made to FIG. 2 of the drawings the logic diagram of a typical participant's control unit has been depicted. In this showing a positive voltage is connected to terminals 41, 42, and 43. The positive voltage connects to three momentary push buttons or switches schematically shown as 44, 45, and 46. These switches represent the button that the participant has to activate to indicate his choice to a question. The above switches connect to NAND circuitry 47, 48, and 49 and their counterparts 47', 48' and 49'. The coded signals from the slide sensor are connected to terminals 50, 51, and 52 and the inverse of these coded signals are connected to terminals 50', 51', and 52'. As an example if the conductors connected to terminal 51 would contain the correct answer from the slide sensor it would be high or positive and terminals 50 and 52 would be low or zero. Since the inverse of these voltages appears at the primed terminals, terminal 50', and 52' would be positive and 51' would be zero or negative.

An inhibit signal for all NAND circuitry is supplied from the inverter 60 carrying the inhibit signal (later to be further mentioned), and conductor 61 to all the NAND circuits and normally will be positive or high. In operation for the example that terminal 51 is positive, depressing switch 45 represents a correct answer and will satisfy the NAND condition for NAND gate 48 which will yield a low output signal from NAND gate 48. NAND gates 47 and 49 as well as 47', 48' and 49' will yield no low output signal since their NAND condition is not satisfied. Lines 63, 64, and 65 carry the "true" answer if any to NOR gate 66 which is activated by any low input signal to yield a high output signal. Since wire 64 carries a low output from NAND gate 48, monostable multivibrator 68 representing the correct answer is activated. NAND gates 47', 48' and 49' do not yield a low output since their NAND requirements (3 high inputs) are not satisfied and their output lines 63', 64', and 65' will be high and the output of NOR gate 66' will be low and will not activate the monostable multivibrator 69 representing an incorrect answer.

In the case that an incorrect button is activated, let us assume switch 44 is activated then NAND gates 47, 48, and 49 will not be activated since their NAND requirement (3 high inputs) is not satisfied. NAND gate 47' is activated however since 50' terminal is high and will activate monostable multivibrator 69 by way of NOR gate 66'.

Output signals from the NAND circuits 47, 48 and 49 (or circuits 47', 48' and 49') are supplied through circuits 63, 64, or 65 (or 63', 64', or 65') to provide inputs to the NOR circuits 66 or 66'. The NOR circuits connect to monostable multivibrators 68 and 69 for either the "true" or "correct" choice from the input or for the "error" or "untrue" choice as available at the input signal terminals, as the case may be. It is apparent that the NAND circuits require for their functioning the simultaneous presence of a signal input at all of the input terminals. In this case, it is assumed that the correct code will be a positive signal at the terminal points, such as 50, 51 or 52. Then when there is an output from any one of the NAND circuits there will be a signal input which can become effective to provide an output from the NOR circuit to control the operation of the associated monostable multivibrator.

It will be noted that by this diagrammatic showing the monostable multivibrators 68 and 69 have an output connected, as by conductors 70 and 71, for a "correct" choice signal output, to the NOR circuit 72, whereas, for an "incorrect" choice, the monostable multivibrator 69 connects by way of conductors 73 and 74 into the same NOR circuit 72. The presence of a signal input to the NOR circuit 72 provides an output to trigger a flip-flop circuit 77 which will provide an output signal pulse of polarity opposite that of its state prior to the receipt of any control to activate the NOR circuit 78 by way of the voltages available on conductor 79. It is this NOR circuit 78 which provides the signal input to the inverter 60 which provides an inhibit function already discussed. The flip-flop circuit 77 is normally reset by an input pulse provided at the input terminal 80 and conductor 81 which is originated at the master control box new slide line. NOR circuit 78 also receives an input from the master control box inhibitor, which activates NOR circuit 78 whenever another participant has answered correctly, thereby preventing any other participants from scoring on that question. The inhibit circuit therefore provides for a single answer from a participant as well as for the quickest correct answer among participants.

The two mono-stable multivibrators 68 and 69, respectively, have output connections leading by way of conductors 82 and 83 into the totalizer unit 58. Thus, if a "correct" selection is made by one of the participants at the control consoles 16 or 17, for instance, the counter or totalizer 58 will derive its input signal pulse from conductor 82 and count in the "up," or increasing direction, whereas for an "incorrect" choice the signal input will be in the reverse, or decreasing direction, by way of conductor 83 and the count will be in the reverse direction so that there will be a subtraction of the count already included and thus the error will readily be manifested. The counter 58, of course, can be of many and varied forms so long as either a choice of an increase count is made for each "correct" choice and so long as "incorrect" choices either preclude registrations or subtract from registrations already made. These counter forms are known in the art and need not be further described herein, although it is important that the method effective with an incorrect count shall inhibit the next correct count.

The showing of FIG. 3 simplifies the foregoing and can be considered for a moment to aid in the understanding of the invention. By this showing, the slide code from the slide sensor or coder 12 is supplied to a suitable level control unit 84 through one or more input conductors 85, 86, and 87, thereby to provide for limitation of the signal amplitude (see also FIG. 1). The unit 84 thus serves as a level controller and/or driver which thus limits the supplied voltage into the logic circuit elements that are utilized in the operation. As an example, the outputs of the unit 84 are available on conductors 89, 90, 91 as well as the inverted codes 8940 , 90' or 91' to terminal points 92, 92'; 93,93'; 94, 94'. As an example cited before, if B were to be the correct answer for a particular question the polarity of the terminals would be:

| | |
|---|---|
| 92 | low |
| 92' | high |
| 93 | high |
| 93' | low |
| 94 | low |
| 94' | high |

The selections or answers made by the participants, when "true" or "correct" answers are supplied by the indicated inputs to several NOR circuits (or, if desired to a single NOR circuit having many input terminals) which are here designated as circuits 97, 98 and 99 and which connect at their outputs to energize an amplifier 101 whose output on conductor 102 provides a "true answer received" as an input to a flip-flop circuit 103. Here it may be assumed that the input on conductor 102 serves to set the unit 103 into the inhibit mode.

At the same time the slide advance, coder or sensor 12 can provide an input on conductor 109 to another monostable multivibrator 110, which when caused to reverse its state of operation provides a timing pulse on the conductor 112 that also provides an inhibit input into the flip-flop circuit 103 at one of its input points. The period of the monostable multivibrator 110 can be adjusted in its time duration by adjusting control 113 which may vary a voltage, a capacitance or a resistor to the master control box. This will then serve to adjust the timing of the pulses derived by the flip-flop 103 and control its reset.

When the flip-flop 103 changes from one state to its second state the effect is made use of from its reset position by a pulse available on the conductor 115 which feeds as an inhibit signal from the master control box 14 and, thus, to all participant control units. At the same time a reset condition of the flip-flop circuit 103 can be brought about by a signal pulse supplied by way of conductor 116 from the slide reset condition of the slide sensor 12.

The totalizer 58 (FIG. 2) can take numerous forms most of which are state of the art devices and will be only mentioned for reference. For instance, it may be an up-down counter increasing in count pulses derived from line 82 and decreasing in count for pulses derived on 83. It also may be in the form of bidirectionally rotary solenoids in conjunction with a counter. However FIG. 4 illustrates an analog type totalizer which is useful in the application because of its simplicity. A positive pulse 120 derived from 69 and negative pulse 121 derived from 68 serve as the inputs or terminals 122 or 123 to the analog totalizer. The analog totalizer consists of two resistors connected to the input terminals 122 and 123, Resisters 124 and 125 connect to an amplifier 127 shunted by an integrating capacitor 130. This combination will integrate the two signals appearing at its input terminals 122 and 123. The output voltage of the amplifier 127 will rise for negative inputs and fall for positive inputs and maintain its voltage for a relative long duration of time for no input. Therefore, the resultant voltage at the output terminal of 127 as measured by voltmeter 58 in respect to ground terminal 135 represents the difference between positive and negative pulses or in the application the integrated difference between incorrect and correct answers. The closing of switch 131 discharges the capacitor 130 to initiate a starting condition.

FIG. 5 is purely schematic and shows the control of one of the flip-flop circuits, such as 140, by an input signal from the slide advance or coder 12 supplied on conductor 141, which will set the flip-flop in one direction. This setting will then provide a signal level that can be supplied to the totalizer or counter by conductor 142. At the same time, the flip-flop can be reset when a slide is removed (as, for instance, after a long period of display or when a participant has made a correct identification) which can be done by providing, at such times, a signal pulse on conductors 143 or 144.

At this point certain considerations given to more specific circuitry to achieve the aims and objectives of this invention may prove helpful. For these considerations reference is now made to FIG. 6 of the drawings. It will be noted that the schematic showings set out slightly different and, in many cases, less expensive circuit than do FIGS. 6, 7 and 8. The block diagrams show simple and yet practical means to achieve the results desired and are functional in their choice and operation. There is no strict one-to one relationship between FIGS. 1 through 5 and FIGS. 6 through 8, but the latter FIGS. are shown as constituting a further means to obtain the desired end result.

In FIG. 6 it will be recalled that it was heretofore suggested that for illustration it would be assumed that each participant had a choice of three possible conditions to identify. This could be done by a control of suitable monostable switch or push-button elements, such as 18, 19, or 20 which provide a signal pulse from the terminals 150, 151 and 152 of FIG. 6. Here again it should be emphasized that the selected number three is purely illustrative and it will be understood that more inputs could, and often are, available, as can be done by following the teachings and principles here outlined and adding to the described circuitry. If three separate inputs are chosen the terminal points 150, 151 or 152 will provide a signal pulse on the conductors 154, 155 or 156 each time a control button or switch 18, 19 or 20 is activated (or closed) at the participant's control position. These closures then provide a signal pulse which combines on conductor 157. Input conductors 150, 151 and 152 are normally at a negative voltage potential and originates at the master control box to be described later. One of the conductors will change its potential from negative to positive if the slide sensor senses a correct answer for a particular slide. The conductor associated with the correct answer will therefore be positive, and the conductor associated with incorrect answers will be negative. Therefore, a "correct" choice will provide a positive signal pulse and an "incorrect" choice will provide a negative signal pulse. If, for instance, the choice were such that the circuit including the switch element 18 happened to be chosen then the voltage pulse on conductor 157 would be positive in polarity, whereas if either of the other two choices were made, and the "correct" choice should have been one which would bring about a closure of the contact 18, then the pulse on conductor 157 for closure of either contact 19 or 20 would be negative in its polarity.

The output signal is loaded by the resistor 159 and thus the signal available at point 160 is the signal on conductor 157 relative to ground 135. This signal pulse is then differentiated by the network comprising capacitor 161 and resistor 162, the latter being grounded at one end. The differentiated signal pulse is supplied via conductor 163 and, if positive, will pass through the semi-conductor diode 164 to the so-called "true" or "correct" circuitry, but, if negative, it will pass through the semi-conductor diode 165 into the "false" or "incorrect" circuitry, as will be explained. The general form of signal pulse is shown adjacent to the conductors 166 and 167. The diodes 164 and 165 thus serve as steering diodes to steer the pulses to the appropriate side of the disclosed circuitry. As will be noted from what follows a positive pulse will control the operation of a so-called "true" flip-flop 169, while a negative pulse will control a so-called "false" flip-flop 170.

Considering now the action of the positive pulse, or a response resulting from a "correct" choice of the material exhibited upon the viewing area 13, the "true" flip-flop 169 comprises a pair of transistor elements 171 and 172 and a plurality of resistor elements 173 through 178 which, as is well recognized, function when supplied with a control signal on line conductor 166 and provided with an operating voltage at terminal 180 which provides a positive voltage at terminal 180 to provide a controlled output on conductor 181, as will be explained later as to its use. It may be noted that each transistor 171 and 172 is so connected that it has its emitter grounded at 135 and the positive voltage of the source connected at terminal 180 connects to the collector, while the input signal is supplied to the base element. The input signal pulse feeds across resistor 173 when derived from conductor 166, but across resistor 174 when derived from conductor 185 which will function as a reset and will later be explained.

If the action of the "false" or "incorrect" selection is made and a negative pulse becomes available on conductor 167 that impulse controls the flip-flop 170. Such signal pulse is used to control transistors and 186 and 187. These transistors are connected in a fashion similar to transistors 171 and 172. They have a positive operating voltage applied to them at terminal 189 and, like transistors 171 and 172 are interconnected by means of a plurality of resistor elements 190 through 195 inclusive. The initial control is that which comes from conductor 167 and is supplied across resistor 195 to the base of transistor 187. A controlled output is derived on conductor 197 in accordance with the voltage available at the collector of transistor 186.

Each of the flip-flop circuits is reset as soon as a positive voltage pulse becomes available on conductor 198 from terminal point 199. The voltage which is supplied to terminal 199 is a signal derived from the master control box 14 whenever a new slide or exhibit is projected upon the viewing area or screen 13. It serves as a timing pulse and is normally at ground potential, but goes positive as soon as a new slide or exhibit is shown. This being the case, the input voltage is differentiated by the combination of the capacitor 201 and the resistor 202, with the positive differentiated pulse then supplied by way of the steering diodes 203 and 204 to each of conductors 185 and 205. It has already been noted that conductor 185 controls the flip-flop 169 by providing a control pulse effective on the base of transistor 172 across resistor 174, thereby to change the polarity of the voltage on conductor 181 if flip-flop previously had been set. A similar effect occurs in respect of the flip-flop 170 where the same pulse when supplied by conductor 205 causes the operating condition of the unit to reverse if flip-flop 170 is set and to change the polarity of the signal voltage available at the collector of transistor 186 and thus on the output conductor 197. Thus, the new slide timing pulse available at the terminal 199 provides for resetting both the "true" or "correct" flip-flop 169 and the "flase" or "untrue" flip-flop 170.

These two outputs on conductors 181 and 197, respectively are then supplied by way of the diode elements 207 and 209 to the output terminal 210 by way of conductor 211. This output represents a "true" or "correct" selection at the participant's control and is supplied to the true totalizer and the master control box 14. At the same time that this condition occurs the timing pulse available at the input terminal 199 is also supplied by way of the conductor 212 and the diode 213 to the same output conductor 211. Also supplied to this same output conductor there is a signal pulse from the master control box 14 which will be represented as a true inhibit conductor 214 with its input pulse supplied at the input terminal 215. The conductor supplies the output by way of the diode 216 to the same output conductor 211 as do the outputs of the other diodes 207, 209 and 213. Operating voltage is provided from the terminal point 217 where a positive voltage is supplied and then fed through resistor 218 to all of the diodes. From what has been stated it will become apparent that the various conductors leading to the output conductor all constitute an "and" circuit and will operate in the fashion now to be explained.

The "and" circuit comprises the diodes, as last identified, which each have their anode element connected to the "true" totalizer output terminal 210. In cases where all of the cathodes of the diodes are high the output will be high since the resistor 218 is connected to the high voltage at terminal 217. Any low input to any of the diode elements will keep the output of the "and" circuit at a low output value. Here it may be noted that the cathode element of the diode 216 is connected to conductor 214 and the "true inhibit line" from the master control box 14 which is normally "high" but which goes to a low value as soon as any participant answers correctly to what is displayed upon the viewing region 13. This, of course, precludes any other participant from scoring. The input to the diode 213 is the "new slide timing" and prevents any participant from scoring at any time except when a new slide is being shown upon the viewing region 13, when, or course, the "new slide timing pulse" is present. The cathode of the diode 207 is connected to the collector of transistor 172 and thus will go to a high potential as soon as a correct answer is provided.

The cathode of the diode 209 is connected to conductor 197 and thus will inhibit the "and" gate once a false answer is given. This prevents any participant from giving more than one answer to each slide. With this in mind it is apparent that the output of the "and" gate represents a "true" answer where that participant is the first with a correct answer and has not previously given an incorrect answer to this particular question or condition. The output of the "and" gate in the case of a "correct" answer will normally be low but will go high for the duration of the "new slide timing" pulse after a correct answer has been given by the participant. As already explained, the output is connected to the "true" totalizer.

It is also worth noting that the "false" flip-flop 170, as available at the collector of the transistor 187 serves to connect via conductor 221 to the terminal 222 which provides a totalization of the "false" answers.

While there is no limitation on the form of the totalizers, as has been mentioned above, they are usually and preferably of the solenoid ratchet type that move one position each time that they are energized and are connected to a counting wheel that indicates the total count. Usually the "true" answer serves to drive the counter in a clockwise or increasing count direction. Any "false" or untrue count drives the counter in the opposite direction so that the indication is that of the difference between the "true" and the "false" answers, it being, of course, apparent that at each start of an operation of making selections the counters are reset to a zero position. With each participant having his control box connected to a totalizer it is apparent that there is an opportunity to compare scores at the end of the selection period.

Then as an added feature the "and" gate output is also connected by way of the conductor 225 and transistor 227 to an indication lamp 228 which also connects to a terminal 229 whereat a positive voltage is supplied. This makes it possible to provide a visible indication of each correct registration. In a similar fashion the "false" output is connected through a conductor 230 and the transistor 231 to the indicating lamp 232 which is connected to a positive voltage source (not shown) connected at terminal 233. These effects have the advantage that each participant is able to determine visually how each opponent is responding to the visual depictions from the projector upon the viewing area 13.

Now making reference specifically to FIG. 7 further details of the master control box 14 are represented. This unit, of course, serves as a junction box between all of the automatic slide projector 11, the slide sensor 12, all participant control boxes and any recorders. It contains all control timing circuitry to provide control of the automatic slide projector, as well as to provide an inhibit signal to the participant control box so that only the first participant to answer can receive credit for the answer.

The master control box receives as one of its inputs a signal which is indicative of the interposition of a new slide for projection. This signal is provided at the input terminal 235 (see FIG. 7) and supplied across resistor 236 to the conductor 237 to the circuitry which provides the new slide timing pulse supplied to the participant control boxes of each participant. This input is low between each slide but goes highly positive each time a new slide is shown or projected. This signal input is differentiated by the differentiating circuit comprising the capacitor 238 and the resistor 239 and yields a positive pulse. The diode 240 provides a steering diode to supply this pulse to the multivibrator circuit generally indicated as 241. This is a monostable unit and includes the transistor elements 242 and 243, the capacitor 244, and also a plurality of resistors 245 through 250.

The circuit last described so operates that the transistor 243 is conducting in the quiescent state and the transistor 242 is non-conducting in the quiescent state. Thus, whenever a positive pulse is supplied from the differentiating circuit 238, 239, which happens when a new slide is projected, to the base of the transistor 242 it places this transistor in a conductive state and simultaneously places the transistor 243 in a non-conducting state. When this occurs, the capacitor 244 starts to charge through the resistor 248 and then, after a predetermined period of time the circuit returns to its quiescent state. The collector of transistor 242 will normally be highly positive due to the connection to the positive terminal 251, but it will go negative, or at least be of reduced potential, during the duration of the timing pulse. This pulse, as available at the collector of transistor 242 is supplied by way of conductor 255 and resistor 256 to the base of transistor 257. The transistor has its collector connected to the positive source through conductor 258. The input voltage is inverted by the transistor 257 so that the resulting pulse output at the output terminal 259 provides the new slide timing pulse which is available at all participant control boxes. As can be seen from the wave form adjacent to the output conductor from the transistor collector to the output terminal 259 is low except during the timing cycle when it is high.

The steering diode 262 is also connected to the output of the differentiating network comprising the capacitor 238 and the resistor 239. It is used to reset the inhibiting flip-flop network comprising the transistors 263 and 264, and is broadly indicated as 265. The remainder of the flip-flop circuit comprises resistors 266 through 271. The other side of the flip-flop 265 is connected to an "or" circuit comprising a plurality of diode elements 273 through 277 (assuming, for illustration, that there are five separate inputs) which, in turn, lead to terminal inputs 278 through 282 respectively. The number of inputs, of course, is dependent upon the number of participants and each terminal provides an input signal pulse which is indicative of the "true" output of one of the control boxes of one of the participants.

It will be observed that, as shown, each of the diode cathodes is connected to a common conductor 283 which provides the output from this "or" gate. With this form of connection it is apparent that the inhibit flip-flop 265 is set as soon as any of the "true" flip-flops in any of the participant's control boxes has been set by some selection, by way of the connection of the "or" gate through the conductor 283 and through resistor 272 to the base of transistor 264. The inhibit flip-flop 265 will then prevent any later correct answer for this operation from being scored by any totalizer, so that only the first correct answer will be entered into the respective totalizer.

The collector of the transistor 264 is normally high in the reset stage but goes to a low potential as soon as there is any pulse voltage on the conductor 283 as a result of a "true" input on the conductor due to one of the terminals 278 through 282 receiving such a polarity pulse from one of the participant's control box. Such low inhibit pulses serve as inhibit pulses to the "and" gate in all of the participant's controls.

The resistors 296, 297, 298 and 236 insure that the coded input lines go quiescently to a negative potential, such as that supplied at the B-terminal, unless they are energized by a sensor and the new slide line connected at terminal 235, which line goes to ground 135 unless energized by some new slide connection or the like.

There is also a synchronized timer in the master control box, as well as an advance mechanism, usually in the form of a monostable multivibrator, to control the advance mechanism. The timer normally comprises a unijunction transistor 307 and timing resistor 308 and the capacitor 309 is synchronized by way of the capacitor 310. The output of the timer is taken from across the resistor 311 where a positive pulse exists for every timer cycle. The capacitor 312 couples this pulse into the multivibrator which has a relay coil 316 in its quiescently nonconducting side of transistor 317. When the timing pulse triggers the monostable multivibrator the relay coil 316 is energized for the duration of the monostable multivibrator time constant primarily determined by the resistor 318 and the capacitor 319. The energization of the coil 316 activates the armature 321. This unit serves as a control of the automatic slide projectors forward slide control and the slide sensor.

Next, one should consider the programmable teacher which is similar to the participant control boxes. In this operation the master control box is not required for a programmable teacher application. In the showing of FIG. 8 the contact terminals 325, 326 and 327 activate the "true" or "flase" flip-flops through the diodes 329 and 330 in the same fashion hereinbefore described for the participant control boxes as in FIG. 6. The reset for the false flip-flop is derived from the stop-scan line through the differentiating network comprising the capacitor 332 and the resistor 333 and the diode 334 or from a power on initial reset switch 335 from terminal 336 through the differentiation network including capacitor 337 and resistor 338 which supply a pulse input through the diode 338', each of which supply the output through the conductor 339.

By this circuitry, the pulse through the diode 329 causes the collector of the transistor 345 to go low when the correct answer has been given and this drives the transistor 346 into conduction. The relay winding 348 is connected in the emitter circuit of this transistor, whose collector is grounded at 135, and with current flow through this winding the forward control relay 350 is energized. Energization of this relay advances the automatic slide projector to a new slide which causes by way of the slide sensor a resetting of the "true" flip-flop by supplying a positive trigger to the base of the transistor 351 by a control voltage supplied on its base electrode.

Whenever there is a "false" reply the collector of the transistor 355 goes positive. This, in turn, causes the energization of the unijunction oscillator 360. The oscillator output drives the relay driver transistor 362 which, with it being in a conducting state, produces a current flow through the winding 364 which controls the relay element 365. This action causes the automatic slide projector and slide sensor to move in the reverse direction at a rate controlled by the oscillator. The reverse scan is stopped by the sensing of the scan stop control by the slide sensor which supplies a positive signal on the line and to the stop scan input which resets the "false" flip-flop.

The stop scan input terminal carries the information previously mentioned as the fourth position sensor of the slide sensor. This terminal in conjunction with the three terminals representing the slide code (if 3 are utilized) serves to denote the start of new instructional material. In operation the participant student advances from slide to slide by advancing the slide projector by depressing the correct switch thereby setting the "true" flip-flop and allowing relay 350 to energize the advance mechanism which is reset by the following slide terminal 368, which input originates also at the slide sensor, and senses that a new slide is presented to the viewer. The participant or student continues to learn from the material presented to him on the slides and answers questions on this material until the apparatus senses that the student did not absorb or comprehend the material which will be manifested by an incorrect answer of the student thereby setting the "flase" flip-flop which activates the reverse scan relay 364 which causes the slide projector to search back to a slide containing the previous fourth position sensor at the associated slide sensor. This slide contains the last instructional material prior to the student answering incorrectly. By repeating this slide the student is permitted a second opportunity to answer the questions again that follow.

A more advanced version is easily constructed also in the apparatus with a provision that if the same fourth sensor is returned to prior to reaching a new one twice in a row, the apparatus will search back to the very beginning and commence again.

Giving consideration now to the response time testing the same components will be utilized except that the totalizer for each participant control box has to be time sensitive. With the analog type totalizer previously described an integrator integrates the positive pulses due to a "true" response. In cases where there is response time testing it is not only important that the participant answers correctly in a pre-establishes time period but also it is a question of how rapid the answer which is "correct" can be given.

In a further consideration of the showing of FIG. 8 it will be noted that the flip-flop which comprises the two transistor elements 345 and 351 is also controlled by the pulses derived from the slide sensor 12 by way of the pulses supplied at the terminal 368 which feed into the flip-flop unit for a control thereof by way of the differentiating circuit comprising the capacitor 369 and the resistor 370 which supply a differentiated pulse through the diode 371 into the base of transistor 351 across the resistor 372. Each transistor of this flip-flop derives positive voltage on its collector elements from the B+ source 373. Whenever current flows through transistor 351 the potential which is effective at its collector is supplied through the decoupling resistor 374 to the transistor 375 at its base. When current flows in this transistor it causes an illumination of the lighting component 376 to indicate a selection of a "true" condition of the displays on the area 13.

Also by a generally similar type of circuit the "stop-scan" pulse on conductor 339 resets flip-flop 356 by driving the collector of transistor 354 high. A false answer produces a negative pulse through diode 330 by way of conductor 377 to resistor 378, which produces a high output level at the collector of transistor 355. This high level energizes transistor 380 and causes the lamp 381 to be illuminated as well as energizing unijunction oscillator 360. When this action occurs it is significant of the fact that there has been a "false" selection made, as already explained. This enables all participants at once to view the results of the operation and to envision their own standing relative to all competition if more than one student utilizes such apparatus and allows teacher or other monitor to follow program of students.

In apparatus of the type herein set forth and with the circuitry of the form described it is not only important whether the participant answers correctly but which categories of questions or displays the participant answers most readily and best. By the form of circuitry here shown and described it is important to bear in mind that this unit is adapted particularly to educational apparatus and to both aptitude and psychological testing. In addition, it is important to consider that it is equally adapted to the testing of response time and that it can serve also as a programmable teacher. In these circumstances the circuitry is such that the sensing and coding, together with the ease of coding changes may readily be achieved by many and various means, as set forth. Further, the circuitry is such that only the first "true" answer is generally the only one which is effective in a registration of the answering ability of the participants, and circuitry by which there can be a totalization of the net results of the results of a combination of true and false answers.

Apparatus of a form so that it can be utilized for aptitude and for psychological testing as was briefly mentioned above. The apparatus in this application could encompass the same participant's control box and master control box as was previously mentioned, with the interacting inhibiting lines between participants disabled, but with the addition of separate totalizers for each subject the participant is tested on. The fourth position sensor previously discussed, with which a fifth, a sixth or more can be utilized to switch the responses to different totalizers for each applicant. The use of separate totalizers for each category results in a spectrum of the applicant's ability thereby readily displaying the subjects where he is strong and weak.

A further refinement of the disclosure is the use of the above apparatus in remote control applications. The educational game, programmable teacher (without search-back function) aptitude, psychological and response time testing as described above are applied with the participants remaining in their homes or geographically separate locations. The operation of the apparatus with this refinement, may be the transmission of the questions posed over television, radio or telephone and the participant, having in his possession a participant control box, will respond to the question so posed, as before, by depressing the appropriate button. The answers may be scored on an individual totalizer by comparing the participant's answer with the slide sensor information supplied to the participant's control box by electronic or audio coded signals, together or separate from the questions over the same as alternate transmission media. The participant's answer may also be transmitted over telephone by means of audio or electronically coded signals to a central point where a master control can operate as previously described.

The utilization of the equipment in geographically remote locations permits the use of the apparatus in the following and other areas:

1. Home study and testing of physically disabled students unable to attend schools.
2. Testing of job applicants from remote areas.
3. The playing of competitive games and contests over a large geographic area.
4. Competitive, nationwide tests such as college entrance examinations, I-Q or other psychological testing by remote control.

Here also it is important to note that the use of audio, magnetic tape control or film adaptations, as already suggested, are fully contemplated and equally adapted to the foregoing uses.

Still other and various modifications and changes will become apparent from what has herein been set forth and it is, therefore, to be understood that this invention is intended to be broadly viewed and that the claims hereinafter appended are to be construed broadly in the light of what is set forth herein and suggested as reasonable modifications and changes.

Having now described the invention, what is claimed is:

1. Apparatus and circuitry for identifying and selecting between different possible conditions comprising
    selecting means for independently making selections and means for registering the selections and distinguishing between correct and incorrect choices,
    means for activating the registering means by a single one only of the plurality of possible choices at any selected time period of which only a single one is correct and for limiting the response to the first choice selected during a finite period after a common start despite the possibility of a differential time period as short as a fraction of a microsecond in the making of the selection,
    means for rendering the selecting means inoperative to control the registering means upon each chosen incorrect selection of one possibility relative to another,
    means to disable the selecting means at all times other than the desired correct periods, and
    means to restore all selecting means to a registering status following the registration of a correct selection and a showing of each delayed and incorrect selection.

2. The apparatus and circuit claimed in claim 1 comprising in addition,
    means to register the precise time required to make the completion of the initial correct selection as measured.

3. The apparatus claimed in claim 1 comprising, in addition,
    means for determining the time period required subsequent to initial display for the establishment of a plurality of selected correct registrations of a chosen display selection within a pre-established time period, and
    means for totalizing and thereby averaging all responses.

4. Registering apparatus for identifying and distinguishing between a single true and a plurality of false possible selections of a group of displays pictorially presented for choice comprising
    selector means for selecting a single first correct one of a group at any selected time period to provide a totalizing of a true selection,
    means for registering and totalizing each true selection,
    means for registering and totalizing each erroneous selection, means for rendering temporarily inoperative the selector means to each of the incorrect selections following an initial correct choice and all selections other than the correct one chosen within the selected time period, means to subtract any incorrect response from a correct response, and means for restoring all selection means to an operative state following the registration of each selection and subsequent to the expiration of the said selected time allotted for selection.

5. The apparatus claimed in claim 4 comprising, in addition, means to display pictorial and audible representations of a sequence of registrations for viewing and hearing, means to present a plurality of possible choices for answerable problems relative to each display, a plurality of console means having a number of selector means corresponding to the possible number of choices, connections between each console means and the registering means to register selections from each console, and means for disabling temporarily the registrations controlled from all consoles other than that first correctly selected with the disability being restricted to a time period between successive displays.

6. The apparatus claimed in claim 5 comprising, in addition, sensing means for selecting the displays in a chosen order, means for keying and controlling each console to identify and distinguish between correct and erroneous selections as related to the instantaneous selected display, and means for adding correct selections and for subtracting weighted versions of incorrect selections.

7. The apparatus claimed in claim 5 comprising, in addition, switching means at each console for determining which of the possible registration indications shall be observable on the registering means.

8. The apparatus claimed in claim 3 comprising, in addition, means for controlling the registering means from the console to limit the registration to a single correct selection only and upon registration in one console to disable all other consoles, and registering means to prevent double selection thereafter for a time period between the initial and subsequent displays of representations presented for choice.

9. The apparatus claimed in claim 8 comprising, in addition, additional means for coding the displays to provide a selected order for display and means for selecting chosen displays in accordance with the coding group so that the registration can be calculated by a pre-established grouping.

10. The apparatus claimed in claim 5 comprising, in addition, means controlled from the console means to produce a control of the registration in the registering means in an additive direction upon a correct selection and for producing a reverse and subtrative condition of the registration direction within the registering means for each incorrect selection at any console.

11. The apparatus claimed in claim 10 comprising, in addition, means controlled from the console means for totalizing the correct and incorrect selections and registering the difference between such selections.

12. The apparatus as claimed in claim 4 comprising, in addition, a master control unit, means included in the master control unit for controlling a discrete timing period of the displayed representations, and means for inhibiting the operation of the registering means in the time intervening between the first correct selection within any of the consoles during a finite selectable time period and the time of the next subsequent display.

13. The apparatus claimed in claim 4 comprising, in addition, sensing means for selecting the displays in a selected order, and means for keying and controlling each console to identify correct and erroneous selections as related to the selected display.

14. The apparatus as claimed in claim 4 comprising, in addition, time control means for controlling the time period during which the console means can provide a control of any possible choices.

15. The apparatus as claimed in claim 4 comprising, in addition, a separate register means responsive to correct selections made from a selected control at a console means to provide for observation of the registration from each control console thereby to permit each console to check at once the correct selection, display means at the console of each participant for each of the visual and audible signals to designate the first correct respondent for each selection, and means for rendering each registering means other than the one controlled to provide a correct display inoperative to control activation from its related console to indicate a correct selection made from another console where the selection is made with any measurable time difference from the first selection.

16. Educational apparatus for identifying and distinguishing between different displayed conditions comprising a plurality of controllable and separated selector means for choosing between the first energized of a plurality of possible circuits and others indicative of different possible choices of one only of a group which is correct, means for registering the selections in the order of choice in the event of correctness of choice, means interlocked with the correct choice selection for rendering unchosen selector means inoperative temporarily to control the registering means upon each choice selection of one possibility relative to another, and means to clear the system following selection to restore all selecting means to a registrating status following a registration.

17. The apparatus claimed in claim 16 comprising, in addition, means to determine the time delay to make the selection and to respond to analysis of the condition displayed for solution.

18. The apparatus claimed in claim 16 comprising, in addition, means to limit the period of inoperativeness of the selector means to the time period between the initiation of the displayed condition and the response thereto of the different displayed conditions of the registering means, and means to determine the content of the material that follows depending upon the previous answer given.

19. Registering apparatus for identifying and distinguishing between a single true and a plurality of false possible selections of a displayed group, comprising selector means for selecting a single one of the displayed group at any one time, means for registering such correct selection as made, means for rendering temporarily inoperative all selector means other than the one from which the correct choice happened to be made at any selected time, means for restoring all selection means to an operative state following the registration and subsequent to a selected time period, and means to subtract and weight any erroneous selections.

20. Apparatus for presenting sequential audible and visual reply tests for multiple choice replies of a plurality of participants to presented questions comprising, means for coding each question for each of a correct reply and the question category, means for totalizing each of the correct and erroneous responses in each category for each participant individually, means for indicating with each totalizing operation the time to make a correct response during a finite time period following a common start to each question with a separate totalizer for each category, participant and correctness, and erroneousness of response, and means to provide an instantaneous aptitude profile following the completion of each test.

* * * * *